(12) United States Patent
Park

(10) Patent No.: US 10,358,362 B2
(45) Date of Patent: Jul. 23, 2019

(54) PUMP HAVING ELECTROLYSIS FUNCTION

(71) Applicant: MIRACLEIN CO., LTD., Incheon (KR)

(72) Inventor: Si Chun Park, Incheon (KR)

(73) Assignee: MIRACLEIN CO., LTD., Incheon (KR)

( * ) Notice: Subject to any disclaimer, the term of this patent is extended or adjusted under 35 U.S.C. 154(b) by 0 days.

(21) Appl. No.: 15/537,969

(22) PCT Filed: Feb. 26, 2016

(86) PCT No.: PCT/KR2016/001909
§ 371 (c)(1),
(2) Date: Jun. 20, 2017

(87) PCT Pub. No.: WO2017/010650
PCT Pub. Date: Jan. 19, 2017

(65) Prior Publication Data
US 2018/0273403 A1 Sep. 27, 2018

(30) Foreign Application Priority Data

Jul. 14, 2015 (KR) .......................... 10-2015-0099962

(51) Int. Cl.
*C02F 1/46* (2006.01)
*C02F 1/467* (2006.01)
(Continued)

(52) U.S. Cl.
CPC .............. *C02F 1/4674* (2013.01); *E04H 4/12* (2013.01); *E04H 4/1245* (2013.01);
(Continued)

(58) Field of Classification Search
CPC ................ C02F 1/4674; C02F 1/46104; C02F 2103/42; C02F 1/461; C02F 1/467;
(Continued)

(56) References Cited

U.S. PATENT DOCUMENTS

| | | | | |
|---|---|---|---|---|
| 3,397,135 A | * | 8/1968 | Otto | .......................... F04D 7/00 |
| | | | | 204/235 |
| 3,897,173 A | * | 7/1975 | Mandroian | ............... F04B 9/08 |
| | | | | 417/240 |
| 8,795,510 B2 | * | 8/2014 | Porat | ..................... C02F 1/4674 |
| | | | | 15/1.7 |

FOREIGN PATENT DOCUMENTS

| | | |
|---|---|---|
| JP | 63-166491 | 7/1988 |
| JP | 2000-161235 | 6/2000 |

(Continued)

OTHER PUBLICATIONS

English translation of the Written Opinion of International Application No. PCT/KR2016/001909, dated Jan. 16, 2018.
(Continued)

*Primary Examiner* — Walter D. Griffin
*Assistant Examiner* — Cameron J Allen
(74) *Attorney, Agent, or Firm* — Kile Park Reed & Houtteman PLLC

(57) ABSTRACT

A feed water pump includes an electrolytic bath and is configured to have a high space-utilization and economical since a separate electrolysis device does not have to be provided. A pump having an electrolysis function includes a pump body having a channel formed thereinside and of which both ends respectively form an inlet and an outlet, wherein the inlet and the outlet are connected to a pipe through which water is transferred; an electrode mounting hole formed on the pump body so as to communicate with the channel of the inside of the pump body; a motor mounted at the pump body so as to generate a flow in which water coming in through the inlet is discharged through the outlet; and an electrode mounted on the electrode mounting hole so as to be positioned at the channel of the inside of the pump body.

4 Claims, 7 Drawing Sheets

(51) Int. Cl.
*F04D 29/42* (2006.01)
*F04D 29/00* (2006.01)
*E04H 4/12* (2006.01)
*F04D 29/70* (2006.01)
*C02F 1/461* (2006.01)
*C02F 103/42* (2006.01)

(52) U.S. Cl.
CPC ......... *F04D 29/005* (2013.01); *F04D 29/426* (2013.01); *F04D 29/708* (2013.01); *C02F 1/46104* (2013.01); *C02F 2103/42* (2013.01); *C02F 2201/4618* (2013.01); *C02F 2303/04* (2013.01); *C02F 2303/20* (2013.01); *C02F 2303/22* (2013.01)

(58) Field of Classification Search
CPC .............. C02F 2303/22; C02F 2303/04; C02F 2201/4618; C02F 2303/20; F04D 29/426; F04D 13/06
See application file for complete search history.

(56) References Cited

FOREIGN PATENT DOCUMENTS

| | | |
|---|---|---|
| JP | 2007-075665 | 3/2007 |
| JP | 2007-177769 | 7/2007 |
| KR | 10-2000-0045101 | 7/2000 |
| KR | 20-0279796 | 6/2002 |

OTHER PUBLICATIONS

International Search Report for International Application No. PCT/KR2016/001909, dated Jun. 2, 2016.

\* cited by examiner

PUMP HAVING ELECTROLYSIS FUNCTION

TECHNICAL FIELD

The present invention relates to a pump having electrolysis function, and more particularly to a pump having electrolysis function which has a novel configuration having a high space utilization and being economical since a separate electrolysis device does not have to be provided.

BACKGROUND ART

Usually, in swimming pools or facilities using water, electrolysis method is used for sterilizing supplied water and cleaning pipe used to supply the water. For this, an electrolysis device is coupled to the pipe, and electrolyte is added to the supplied water and electrolysis reaction is implemented. Then, the water is electrolyzed and sterilized, and the sludge attached on the inner surface of the pipe is ionized and removed by the oxidative and reductive electrolytes generated by the water electrolysis, which results in pipe cleaning.

Accordingly, a separate electrolysis device is installed on the water supply pipe on which a water supply pump is already provided, so the electrolysis device is operated periodically to sterilize and clean the supplied water and the pipe. For this, the separate electrolysis device should be installed on the water supply pipe, which requires an additional cost. And, space is required to accommodate the electrolysis device, so if space is narrow, the electrolysis device is difficult to install.

Moreover, if the electrolysis device is used for long time, scale can be attached on electrodes of the electrolysis device, then electrolysis efficiency is lowered. Therefore, it is required to remove the scale on the electrodes periodically, which is troublesome. And HCl is generally used to remove the scale from the electrodes, and it requires the cost.

DISCLOSURE

Technical Problem

The present invention is proposed to solve the above problems, and the object of the invention is to provide a pump having electrolysis function which has a novel configuration to implement electrolysis operation without separate electrolysis device and results in cost reduction and compact structure, so it can be installed in a narrow space.

Technical Solution

According to an aspect of the present invention, there is provided a pump having electrolysis function, wherein the pump comprises: a pump body having a channel formed therein and of which both ends respectively form an inlet and an outlet, wherein the inlet and the outlet are connected to a pipe through which water is transferred; an electrode mounting hole formed on the pump body so as to communicate with the channel of the inside of the pump body; a motor mounted on the pump body so as to generate a flow in which water coming in through the inlet is discharged through the outlet; and an electrode mounted on the electrode mounting hole so as to be positioned at the channel of the inside of the pump body.

According to another aspect of the present invention, there is provided a pump having electrolysis function wherein, the pump body comprises a main body having the inlet on one side, the outlet on the other side, and a first opening formed adjacent to the outlet and facing to the side direction; and a back plate mounted on the first opening and on which the motor is attached, and the electrode mounting hole is formed on the back plate so that the electrode should be mounted on the back plate.

According to another aspect of the present invention, there is provided a pump having electrolysis function wherein, the motor is an impeller motor having impeller, and the pump body has a back plate on which a motor shaft engaged with the impeller is penetrated, and an impeller case having the inlet and the outlet and engaged with the back plate to cover the impeller, and the electrode mounting hole is formed on the impeller case so that the electrode should be mounted on the impeller case.

According to another aspect of the present invention, there is provided a pump having electrolysis function wherein, the pump body is integrated with an electrolysis chamber having an electrolyte inlet through which electrolyte is introduced and an electrolyte outlet through which the electrolyzed material is discharged into the channel, the electrode mounting hole is formed on the pump body to be communicated with the electrolysis chamber, so that the electrode is positioned in the electrolysis chamber if it is mounted in the electrode mounting hole.

According to another aspect of the present invention, there is provided a pump having electrolysis function wherein, the pump body comprises a main body having the inlet on one side, the outlet on the other side, and a first opening positioned adjacently to the outlet and opened toward the side direction; and a back plate mounted on the first opening and on which the motor is attached, and the electrolysis chamber is integrated with the back plate, and the electrode mounting hole is formed on the back plate to be communicated with the electrolysis chamber, so that the electrode is positioned in the electrolysis chamber while the front end of the electrode being projected into the channel if it is mounted on the electrode mounting hole.

According to another aspect of the present invention, there is provided a pump having electrolysis function wherein, the motor is an impeller motor having impeller, and the pump body has a back plate on which a motor shaft engaged with the impeller is penetrated through, and an impeller case having the inlet and the outlet and engaged with the back plate to cover the impeller, and the electrolysis chamber is integrated with the impeller case, and the electrode mounting hole is formed on the impeller case to be communicated with the electrolysis chamber, so that the electrode is positioned in the electrolysis chamber while the front end of the electrode being projected into the channel if it is mounted on the electrode mounting hole.

Advantageous Effect

According to the present invention, the electrode mounting hole is formed on the pump body of the pump, so that, if the electrode is mounted on the pump body, the supplied water introduced into the channel inside the pump body is electrolyzed. That is, as the pump itself has a function of electrolysis device, there is no need to install a separate electrolysis device on the pipe, which is economical and space saving in comparison with installing a separate electrolysis device.

Accordingly, only if the pump is operated, the fed material introduced into the pump, that is, the supplied water will be electrolyzed and sterilized, and the sludge in the pipe is also removed to achieve a cleaning effect of the pipe.

In particular, if the electrode mounting hole is formed on the back plate or the impeller case, so the electrode is mounted on the back plate or the impeller case, the conventional pump can be upgraded to the pump having electrolysis function according to the present invention only by replacing the back plate or the impeller case, which is very economical.

And, as the electrolysis chamber is formed in the pump, and the electrode is positioned in the electrolysis chamber, and if dilute HCl is used as electrolyte, hypochlorous acid is produced, so sterilizing effect of the water supplied in the pipe is enhanced, and cleaning effect on the pipe is also increased, and the scale formed on the electrode is also removed effectively. So there is no need to take measures to remove the scale on the electrode.

In addition, if the electrolysis chamber is integrated with the back plate which is a part of the pump body, the manufacturing or fabrication of the pump is easy than when separated electrolysis chamber is attached on the pump body, and the invention can be easily achieved by utilizing the conventional pump structure.

DETAILED DESCRIPTION OF THE INVENTION

Figure 1:
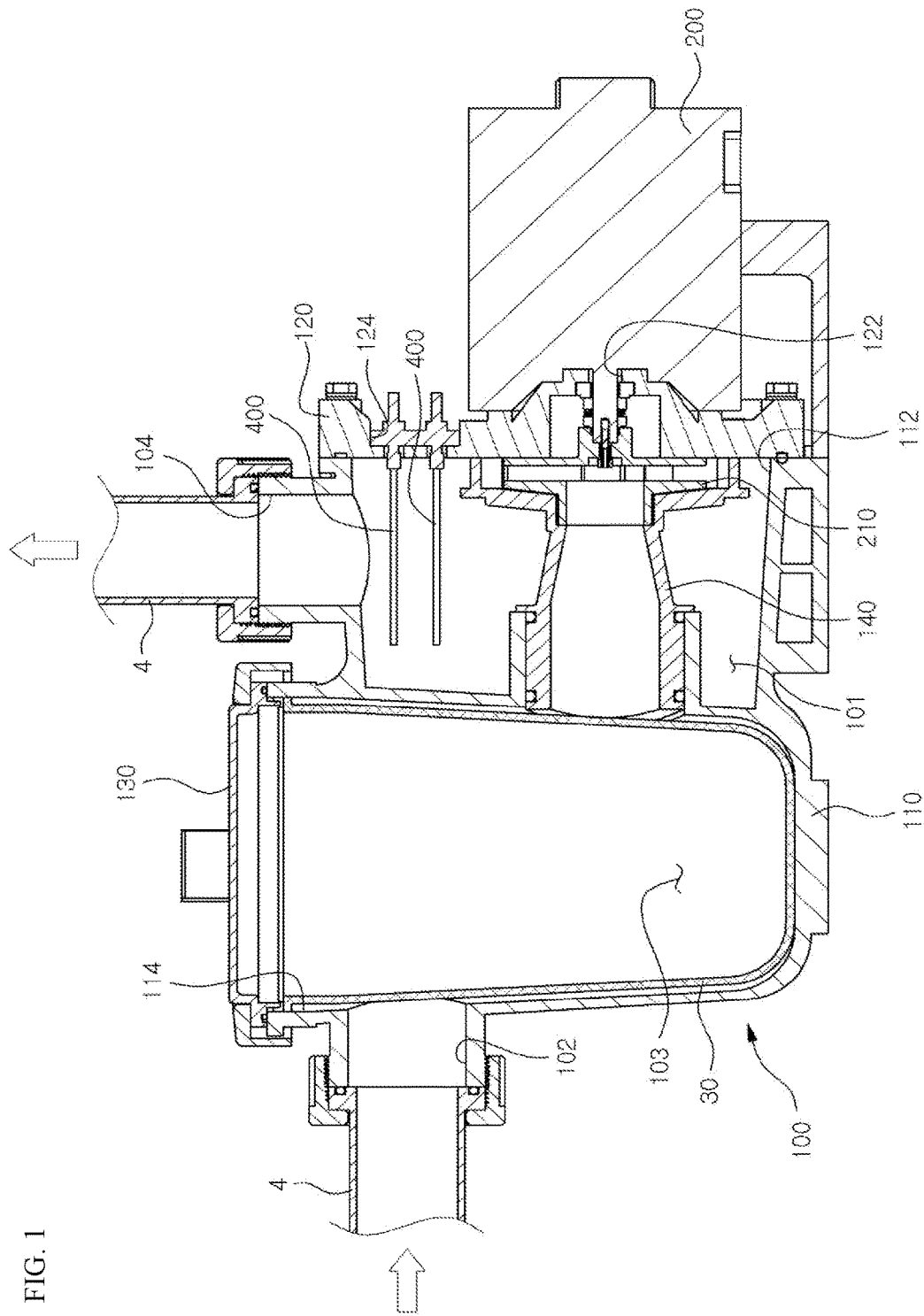
FIG. 1 is a sectional view of the first embodiment of the present invention

Hereinafter, the preferred embodiments of the invention will be described with reference to the drawings. FIG. 1 is a sectional view of the first embodiment of the present invention. As shown, the invention includes a pump body 100 having a channel 101 formed therein, a motor 200 and electrodes 400. One end of the channel 101 in the pump body 100 is an inlet 102 and the other end of the channel 101 is an outlet 104, to which the pipe 4 is connected, so the pipe 4 is communicated with the channel 101 of the pump body 100. A part of the channel 101 is enlarged to form a filter section 103 to accommodate the filter 30.

As described above, the inlet 102 is formed at one end of the pump body 100 and the outlet 104 is formed at the other end of the pump body 100, and the pump body 100 comprises the main body 110 which has a first opening 112 preferably formed adjacently to the outlet 104 and a second opening 114 formed on the upper surface of it to accommodate the filter section 103, a back plate 120 mounted on the first opening 112, and a filter cover 130 to cover the second opening 114.

As shown, a cylindrical filter 30 is contained in the filter section 103, so the water introduced from the inlet 120 is filtered by the filter 30 and discharged through the outlet 104. The filter 30 can be exchanged through the second opening 114.

The motor 200 is preferably an impeller motor having impeller 210, and the back plate 120 has a shaft hole 122 in which the motor shaft engaged with the impeller 210 is penetrated. So the motor 200 is attached on the back plate 120 with the motor shaft being engaged with the shaft hole 122.

In this embodiment, the electrodes 400 is mounted on the back plate 120. Preferably, +, − electrodes 400 are connected to a base plate to form an electrode unit, and an electrode mounting hole 124 is formed on the back plate 120 to mount the electrode unit detachably.

If the back plate 120 on which the electrode 400 is being mounted is engaged with the main body 110, the electrode 400 and the impeller 210 of the motor 200 will be positioned in the channel 101 inside the pump body 100, then the channel 101 becomes electrolysis space as the electrode 400 is positioned in the channel 101. A diffuser 140 is placed in front of the impeller 210 of the motor 200 to guide water passing the filter 30 to be introduced into the impeller 210.

The present invention as described above is operated as follows. If electric power is applied on the pump, then the motor 200 is driven, and the water in the pipe 4 connected to the pump is introduced through the inlet 102 into the channel 101 inside the pump by suction force generated by the motor 200, then the water is filtered by the filter 30 installed in the channel 101, and is discharged through the outlet 104.

And if the electric power is applied on the electrode 400, the water flowing in the channel 10 is electrolyzed by the electrode 400, so the water is sterilized, and the sludge inside the pipe 4 is also removed.

According to this embodiment of the present invention, as the electrode 400 is mounted on the back plate 120, the invention can be easily achieved by attaching the back plate 120 on which the electrode 400 is mounted on the conventional pump body without changing structure of the conventional pump.

The other embodiments of the invention will be described, but the description about the same elements and same effect as those of the above embodiment will be omitted.

Figure 2:
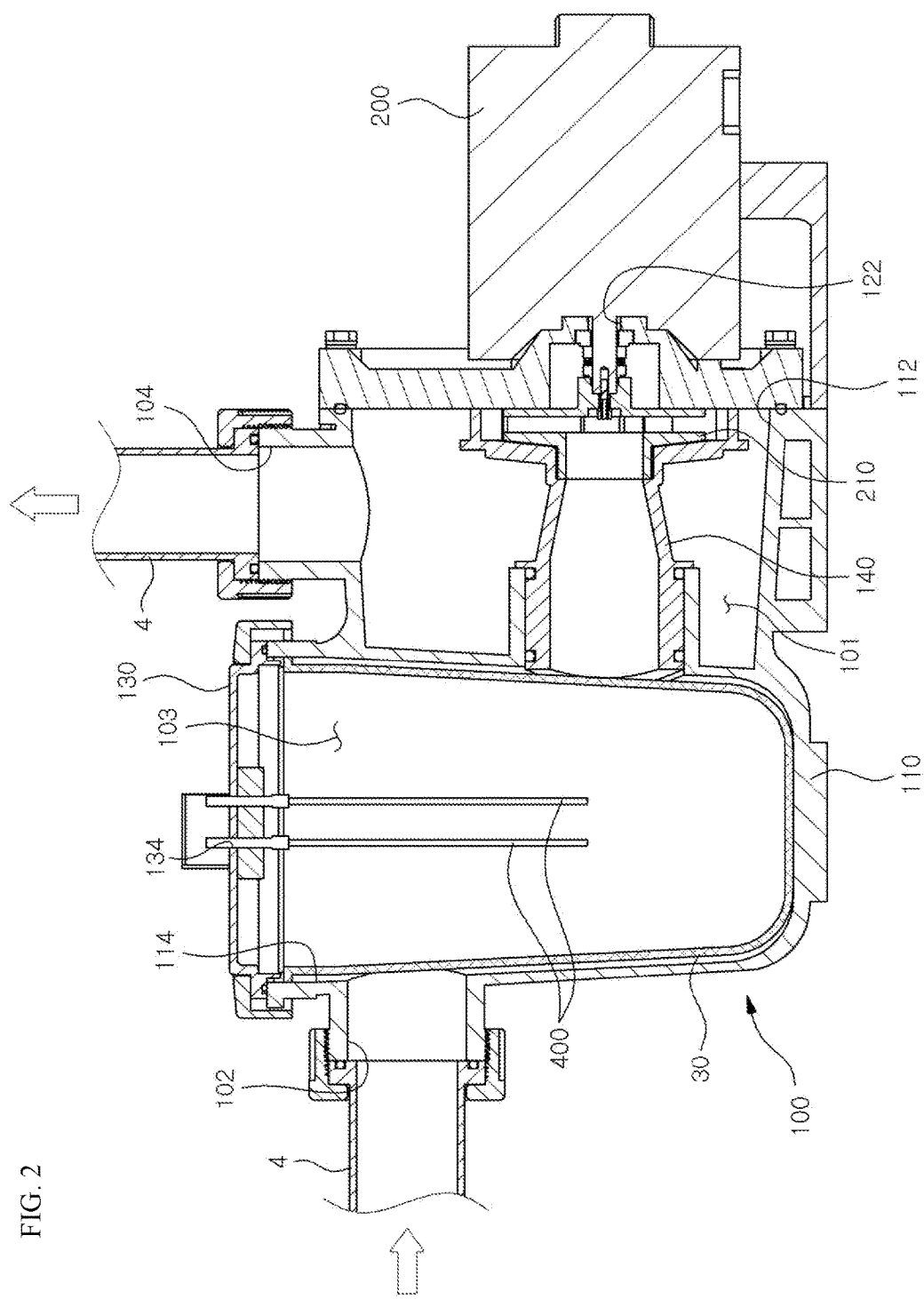
FIG. 2 is a sectional view of the second embodiment of the present invention

FIG. 2 shows the second embodiment of the present invention, in which an electrode mounting hole 134 is formed on the filter cover 130, so that the electrode 400 is mounted on the filter cover 130.

Figure 3:
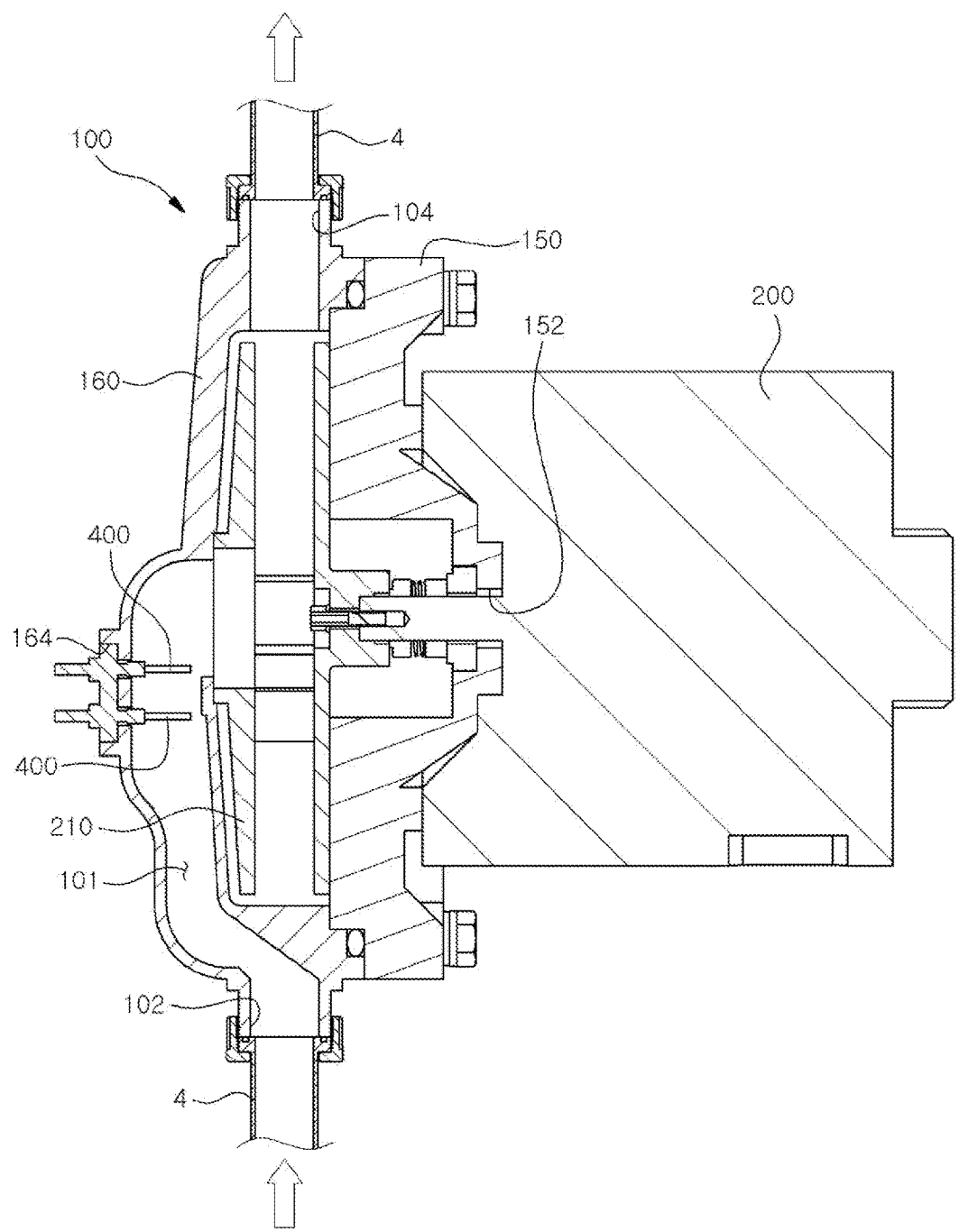
FIG. 3 is a sectional view of the third embodiment of the present invention

FIG. 3 shows the third embodiment of the present invention, in which the pump body 100 includes a back plate 150 on which the motor 200 is mounted and a impeller case 160 having an inlet 102 and an outlet 104 and being engaged with the back plate 150 to cover the impeller 210 of the motor. If the impeller case 160 is engaged with the back plate 150, the space between the back plate 150 and the impeller case 160 forms the channel 101. Numeral 152 is a shaft-hole formed on the back plate 150 to be penetrated by the shaft of the motor 200.

In this embodiment of the present invention, the electrode mounting hole 164 is formed on the impeller case 160, so that the electrode 400 is mounted on the impeller case 160. Preferably, the electrode 400 is formed as electrode unit, so that the electrode unit can be detachably mounted on the electrode mounting hole 164.

Figure 4:
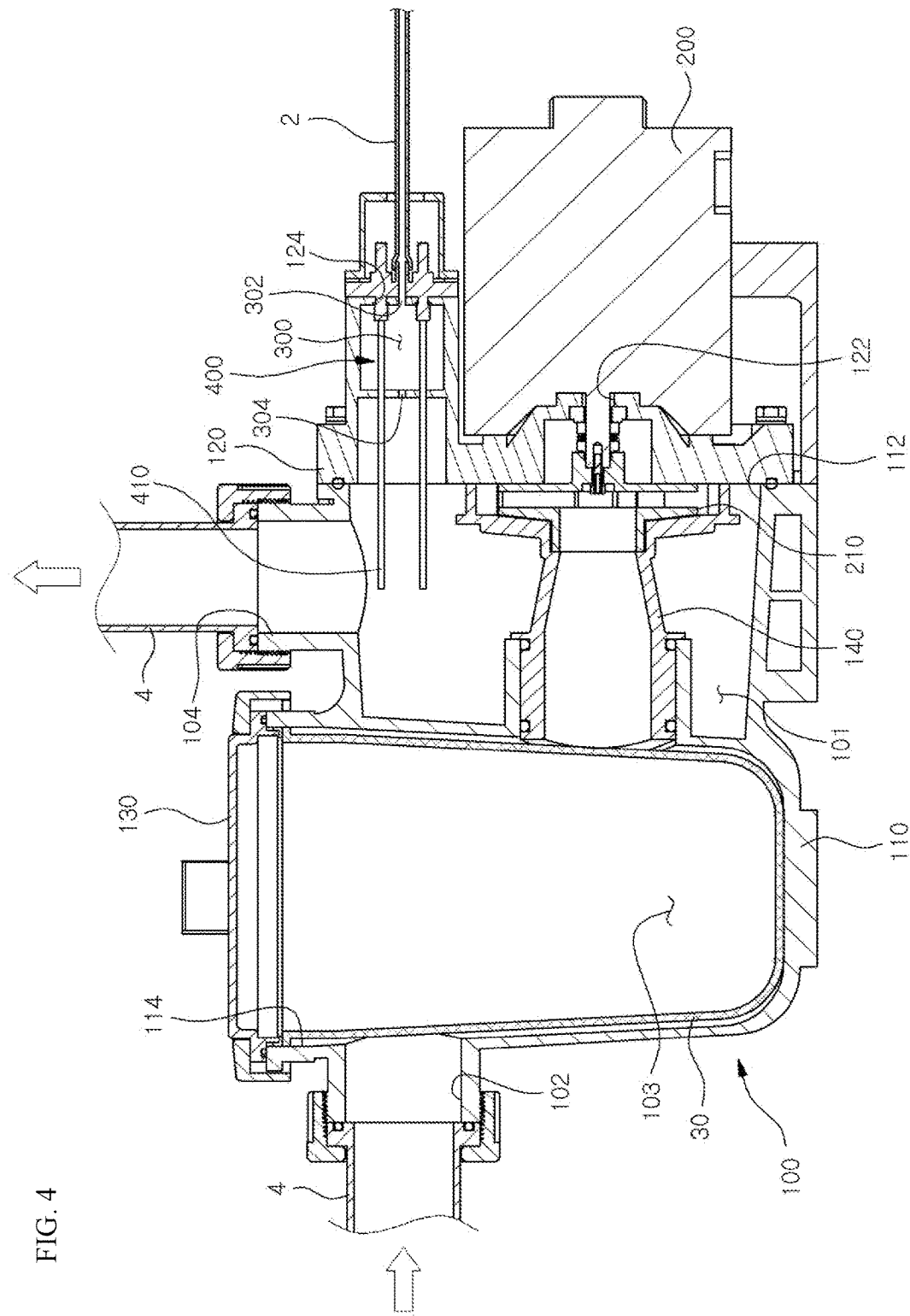
FIG. 4 is a sectional view of the fourth embodiment of the present invention

FIG. 4 shows the fourth embodiment of the present invention. According to the embodiment of the invention, an electrolysis chamber 300 is formed inside the pump, and the electrode 400 is positioned in the electrolysis chamber 300. As shown, the electrolysis chamber 300 has an electrolyte inlet 302 through which electrolyte is introduced and an electrolyte outlet 304 through which the electrolyzed material is discharged, and the electrolyte outlet 304 is communicated with the channel 101. The electrolysis chamber 300 is integrated with the back plate 120. The electrolyte inlet 130 is connected with the electrolyte supply line 2, and the preferable electrolyte is dilute HCl.

The electrode mounting hole 124 is formed on the back plate 120 to be communicated with the electrolysis chamber 300, so, if the electrode 400 is inserted in the electrode mounting hole 124, the electrode 400 may be positioned in the electrolysis chamber 400. As shown, the electrode 400 has a projection 410 at the front end projecting out of the electrolysis chamber 300, and, if the back plate 130 is mounted on the main body 110, then the projection 410 is extended into the channel 101 of the main body 110.

This embodiment will be operated as follows. If electric power is applied on the pump, the water in the pipe 4 connected to the pump is introduced through the inlet 102 into the channel 101 inside the pump by suction force generated by the motor 200, then the water is filtered by the filter 30 installed in the channel 101, and is discharged through the outlet 104. And if the electric power is applied on the electrode 400, the dilute HCl introduced through the electrolyte inlet 300 is electrolyzed to generate Cl gas in the electrolysis chamber 300. The generated Cl gas is discharged through the electrolyte outlet 304 into the channel 101, and the Cl gas is solved into the water in the channel 101 to generate hypochlorous acid, that is, hypochlorous acid water. At this time, a part of Cl gas can be solved in the electrolysis chamber 300 and is discharged into the channel 101 as hypochlorous acid.

As described above, as dilute HCl is electrolyzed to generate Cl gas, which generates hypochlorous acid water in the channel 101, and the hypochlorous acid water will sterilize the supplied water in the pipe 4, and remove the sludge inside the pipe 4 to achieve pipe cleaning.

Meanwhile, as described above, HCl is electrolyzed to generate Cl gas, and the Cl gas is solved into water to generate hypochlorous acid, that is, hypochlorous acid water, but a part of Cl gas is reacted as the formula below to regenerate HCl, so pH of the hypochlorous acid water is lowered.

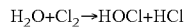

But, as the hypochlorous acid water has high sterilizing power in the weak acid level such as pH 5~6.5, it is necessary to heighten pH valve of hypochlorous acid water to the weak acid level in order to enhance sterilizing power of hypochlorous acid water.

According to the present invention, the regenerated HCl in the channel 101 is electrolyzed by the projection 410 of the electrode 400 to generate hypochlorous acid. Like this, the regenerated HCl is electrolyzed to generate hypochlorous acid, therefore, pH of hypochlorous acid is heighten, and concentration of hypochlorous acid is increased to enhance the sterilizing power.

Meanwhile, while the electrode 400 being used, scale may be accumulated on the surface of the electrode 400. But scale on the part of electrode 400 positioned in the electrolysis chamber 300 is removed by dilute HCl introduced into the electrolysis chamber 300, and the scale on the projection 410 extending into the channel 101 of the electrode 400 is removed, as described above, by HCl generated in the channel 101.

As mentioned above, the scale of the electrode 400 can be effectively removed, so there is no need to do troublesome works to detach and clean the electrode 400, or to apply current reversely on the electrodes 400.

In addition, in this embodiment, as the electrolysis chamber 300 is integrated with the back plate 120 constituting the pump body 100, it is easy to manufacture or assemble the pump in comparison with the pump in which an electrolysis chamber 300 is separately provided. And the pump with the electrolysis function can be achieved without serious change of the conventional pump structure.

Figure 5:
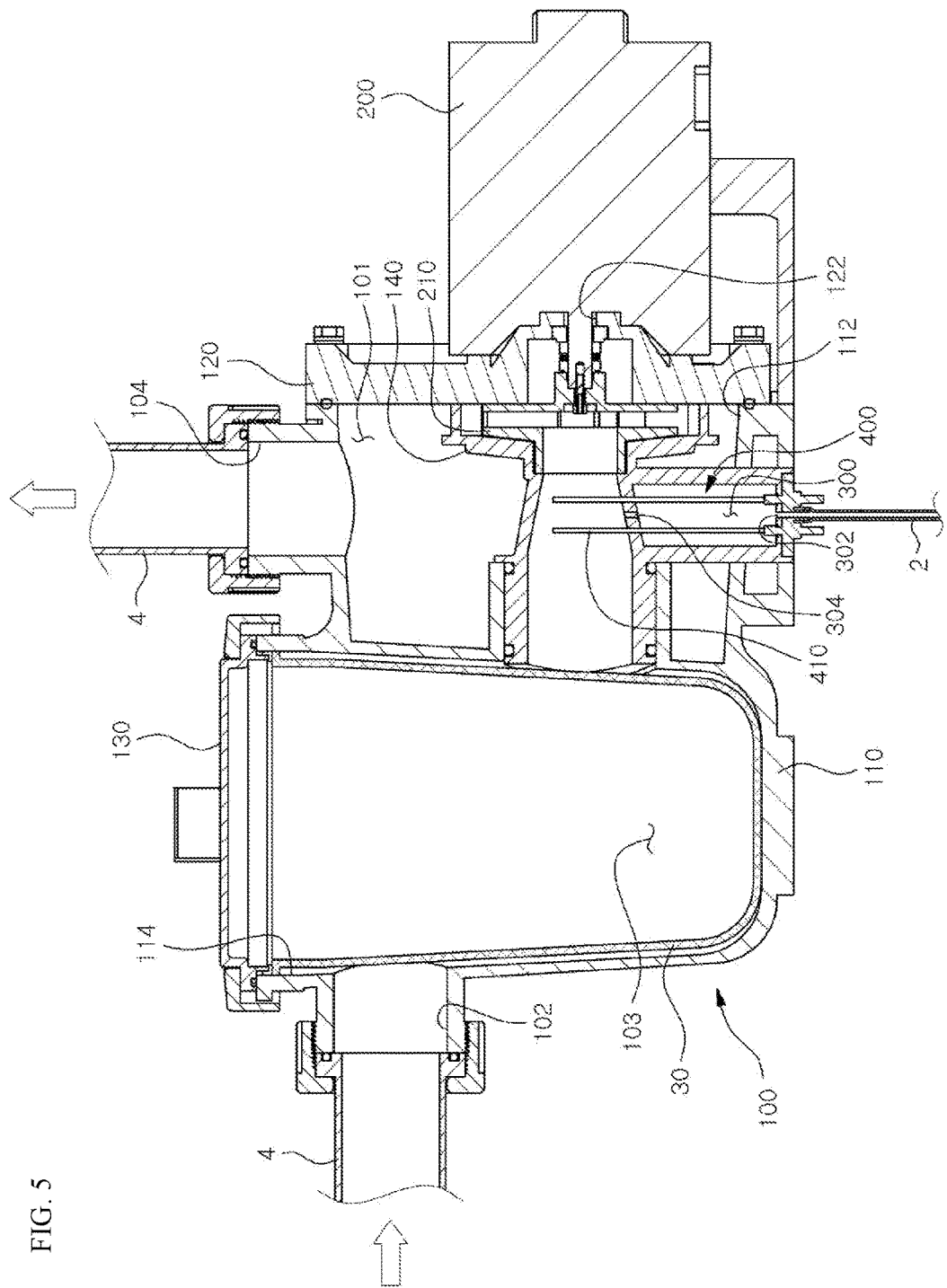
FIG. 5 is a sectional view of the fifth embodiment of the present invention

FIG. 5 shows the fifth embodiment of the present invention, in which the electrolysis chamber 300 is integrally formed on one side of the diffuser 140 of the motor 200. In this embodiment, the electrode 400 is penetrated into the side wall of the diffuser 140 to extend into the channel 101.

Figure 6:
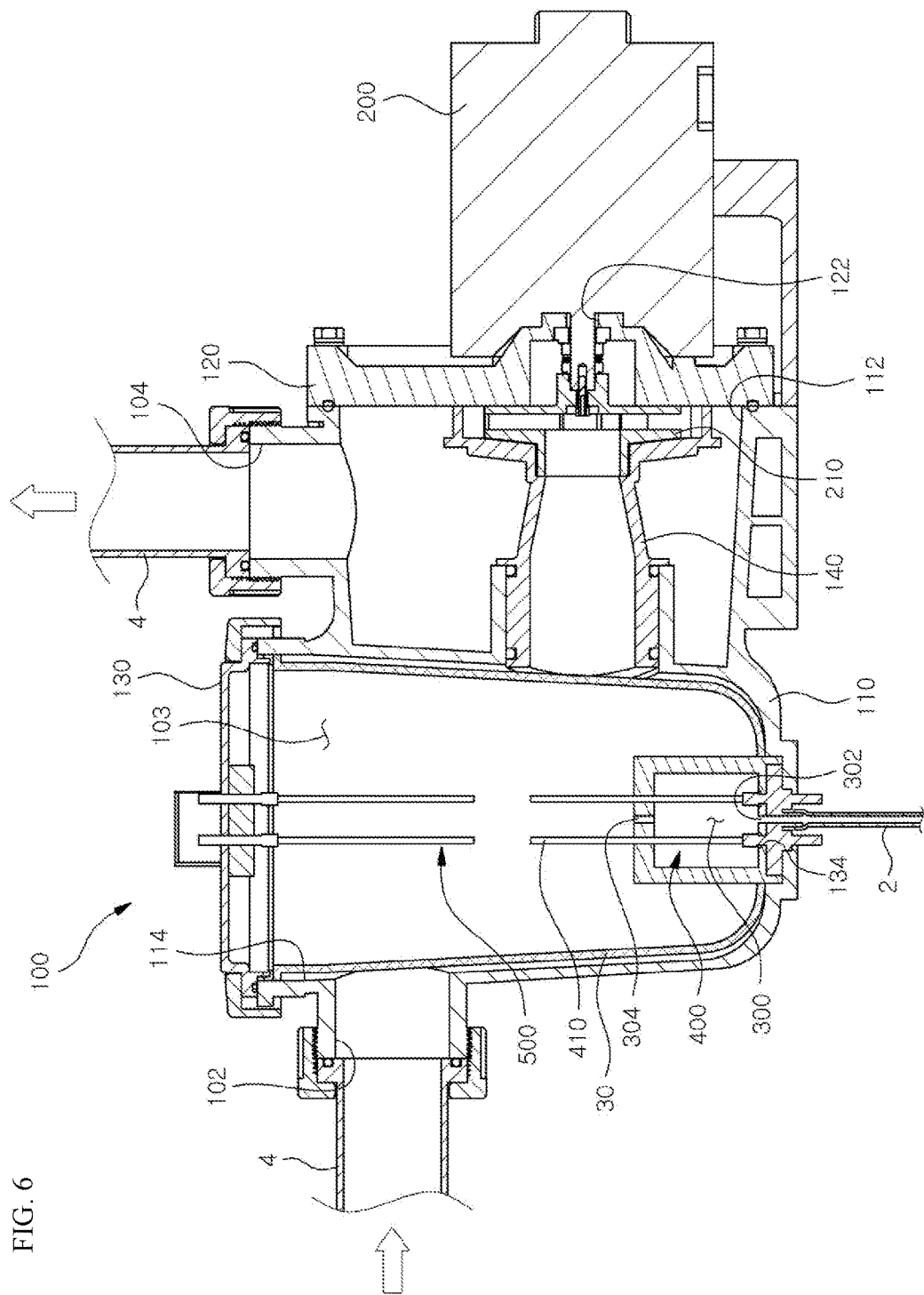
FIG. 6 is a sectional view of the sixth embodiment of the present invention

FIG. 6 shows the sixth embodiment of the present invention, in which the electrolysis chamber 300 is formed in the filter section 103. As shown, the electrolysis chamber 300 is positioned in the filter section 103, and an electrode mounting hole 134 is formed on the main body 110 to be communicated with the electrolysis chamber 300. And an auxiliary electrode 500 is additionally mounted on the filter cover 130. If the auxiliary electrode 500 is mounted, by applying the different currents on the electrode 400 and the auxiliary electrode 500 respectively, it is possible to carry out the electrolysis reactions with different conditions in the electrolysis chamber 300 and the channel 101 inside the pump body 100 respectively.

Figure 7:
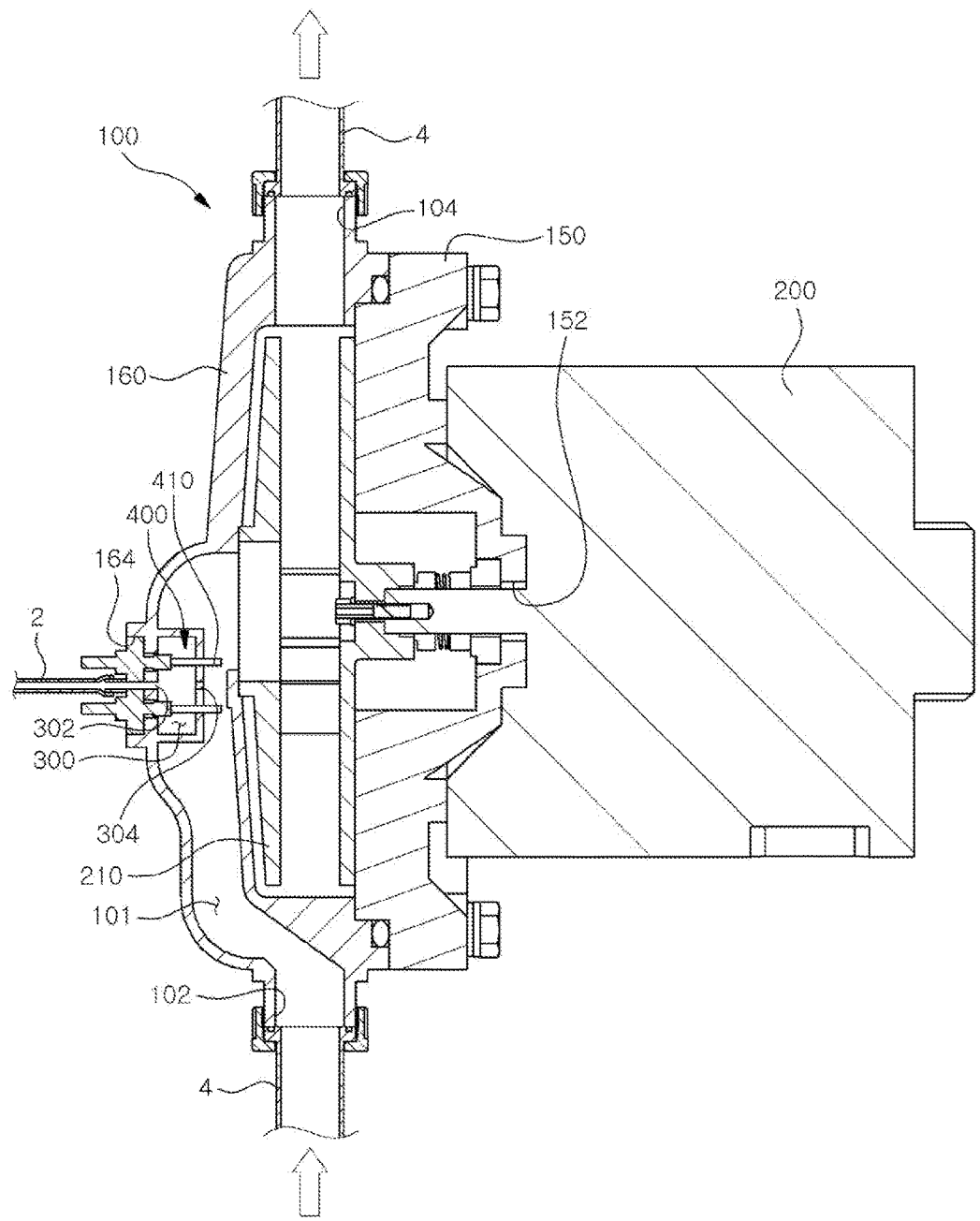
FIG. 7 is a sectional view of the seventh embodiment of the present invention

FIG. 7 shows the seventh embodiment of the present invention, in which, similarly to the third embodiment, the pump body 100 comprises a back plate 150 on which the motor is mounted, and a impeller case 160 having the inlet 102 and the outlet 104 and being engaged with the back plate 150 to cover the impeller 210 of the motor 200. The electrolysis chamber 300 is formed in the impeller case 160. And the electrode mounting hole 164 is formed on the impeller case 160 to be communicated with the electrolysis chamber 300, so that, if the electrode 400 is mounted on the impeller case 160, the electrode 400 is positioned in the electrolysis chamber 300, and the front end of the electrode 400 penetrates the electrolysis chamber 300 to extend into the channel 101 and form the projection 410.

According to this embodiment of the present invention, the present invention can be easily achieved by replacing the impeller case 160 on which the electrolysis chamber 300 is formed and the electrode 400 is mounted.

The invention claimed is:

1. A pump having electrolysis function, wherein the pump comprises:
a pump body having a channel formed therein and of which both ends respectively form an inlet and an outlet, wherein the inlet and the outlet are connected to a pipe through which water is transferred;
an electrode mounting hole formed on the pump body so as to communicate with the channel of the inside of the pump body;
a motor mounted on the pump body so as to generate a flow in which water coming in through the inlet is discharged through the outlet; and
an electrode mounted on the electrode mounting hole so as to be positioned at the channel of the inside of the pump body,
wherein the pump body comprises a main body having the inlet on one side, the outlet on the other side, and a first opening formed adjacent to the outlet and facing to the side direction; and a back plate mounted on the first opening and on which the motor is attached, and the electrode mounting hole is formed on the back plate so that the electrode should be mounted on the back plate.

2. A pump having electrolysis function, wherein the pump comprises:
a pump body having a channel formed therein and of which both ends respectively form an inlet and an outlet, wherein the inlet and the outlet are connected to a pipe through which water is transferred:
an electrode mounting hole formed on the pump body so as to communicate with the channel of the inside of the pump body;
a motor mounted on the pump body so as to generate a flow in which water corning in through the inlet is discharged through the outlet; and
an electrode mounted on the electrode mounting hole so as to be positioned at the channel of the inside of the pump body,
wherein the motor is an impeller motor having impeller, and the pump body has a back plate on which a motor shaft engaged with the impeller is penetrated, and an impeller case having the inlet and the outlet and engaged with the back plate to cover the impeller, and the electrode mounting hole is formed on the impeller case so that the electrode should be mounted on the impeller case.

3. A pump having electrolysis function, wherein the pump comprises:
a pump body having, a channel formed therein and of which both ends, respectively form an inlet and an outlet, wherein the inlet and the outlet are connected to a pipe through which water is transferred;
an electrode mounting hole formed on the pump body so as to communicate with the channel of the inside of the pump body;
a motor mounted on the pump body so as to generate a flow in which water coming in through the inlet is discharged through the outlet; and
an electrode mounted on the electrode mounting hole so as to be positioned at the channel of the inside of the pump body,
wherein the pump body is integrated with an electrolysis chamber having, an electrolyte inlet through which electrolyte is introduced and an electrolyte outlet through which the electrolyzed material is discharged into the channel, the electrode mounting, hole is formed on the pump body to be communicated with the electrolysis chamber so that the electrode is positioned in the electrolysis chamber if it is mounted in the electrode mounting hole,
wherein the pump body comprises a main body having the inlet on one side, the outlet on the other side, and a first opening positioned adjacently to the outlet and opened toward the side direction; and a back plate mounted on the first opening and on which the motor is attached, and the electrolysis chamber is integrated with the back plate, and the electrode mounting hole is formed on the back plate to be communicated with the electrolysis chamber, so that the electrode is positioned in the electrolysis chamber while the front end of the electrode being projected into the channel if it is mounted on the electrode mounting hole.

4. The pump having electrolysis function of claim 3, wherein the motor is an impeller motor having impeller, and the pump body has a back plate on which a motor shaft engaged with the impeller is penetrated through, and an impeller case having the inlet and the outlet and engaged with the back plate to cover the impeller, and the electrolysis chamber is integrated with the impeller case, and the electrode mounting hole is formed on the impeller case to be communicated with the electrolysis chamber, so that the electrode is positioned in the electrolysis chamber while the front end of the electrode being projected into the channel if it is mounted on the electrode mounting hole.

* * * * *